(12) United States Patent
Kell

(10) Patent No.: US 6,869,351 B1
(45) Date of Patent: Mar. 22, 2005

(54) TRAY FOR TENDERIZING AND MARINATING MEATS

(76) Inventor: Curtis Kell, 35417 Oak Knoll Rd., Burlington, WI (US) 53105

( * ) Notice: Subject to any disclaimer, the term of this patent is extended or adjusted under 35 U.S.C. 154(b) by 0 days.

(21) Appl. No.: 10/446,205

(22) Filed: May 27, 2003

(51) Int. Cl.[7] .................................................. A22C 9/00
(52) U.S. Cl. ........................ 452/143; 452/141; 452/145
(58) Field of Search ................................. 452/141, 142, 452/143, 144, 145, 146, 147; D7/382, 68.2

(56) References Cited

U.S. PATENT DOCUMENTS

| | | | |
|---|---|---|---|
| 67,991 A | * 8/1867 | Lefeber | 452/143 |
| 84,718 A | * 12/1868 | Thompson | 452/142 |
| 94,852 A | * 9/1869 | Thompson | 452/141 |
| 112,092 A | 2/1871 | Tarbox | |
| 158,280 A | 12/1874 | James | |
| 166,189 A | * 8/1875 | Comstock | 452/142 |
| 179,611 A | 7/1876 | Roemer | |
| 198,974 A | 1/1878 | Fuller | |
| 347,651 A | * 8/1886 | Sharp | 452/142 |
| 715,695 A | 12/1902 | Robinson | |
| 761,728 A | * 6/1904 | Tolen | 452/143 |
| 824,319 A | * 6/1906 | Tolen et al. | 452/143 |
| 857,568 A | 6/1907 | Hurley | |
| 2,274,250 A | 2/1942 | Simpkins | |
| 2,396,020 A | 3/1946 | Savage | |
| 2,492,997 A | * 1/1950 | Herceg | 452/143 |
| 2,694,221 A | 11/1954 | Dura | |
| 4,217,817 A | * 8/1980 | Meamber | 99/349 |
| 4,242,774 A | * 1/1981 | Massaro | 452/144 |
| 5,393,261 A | 2/1995 | Winton | |
| 5,913,965 A | * 6/1999 | Gargano | 99/346 |
| 6,159,090 A | 12/2000 | Thompson | |

FOREIGN PATENT DOCUMENTS

EP 0044064 * 1/1982

* cited by examiner

Primary Examiner—Peter M. Poon
Assistant Examiner—David Parsley
(74) Attorney, Agent, or Firm—Michael I. Kroll

(57) ABSTRACT

A tray for tenderizing a piece of meat that has a base and a tray wall extending around a periphery of the base forming a pool for retaining marinade within the tray. A plurality of tines extend from a first side of the base and into the pool. Upon placing a piece of meat atop the plurality of tines, a plurality of holes are cause to be punctured in a surface of the meat adjacent to the tines thereby increasing the surface area of the meat able to absorb the marinade.

2 Claims, 12 Drawing Sheets

TRAY FOR TENDERIZING AND MARINATING MEATS

BACKGROUND OF THE INVENTION

1. Field of the Invention

The present invention relates generally to meat tenderizers and, more specifically, to a tenderizing tray having a plurality of conical projections extending upward from a base thereof. The conical projections cause holes to be punctured in the surface of the meat which aide in the retention of marinades and spices contained in the tenderizing tray. Additionally, the conical projections provide a greater heated cooking surface when the meat is being cooked.

2. Description of the Prior Art

Numerous other devices for tenderizing meat exist in the prior art. Typical of these is U.S. Pat. No. 112,092 issued to L. B. Tarbox on Feb. 21, 1871.

A patent was issued to J. W. James on Dec. 29, 1874 as U.S. Pat. No. 158,280. Yet another U.S. Pat. No. 198,974 was issued to H. R. Fuller on Jan. 8, 1878 and F. M. Robinson was issued U.S. Pat. No. 715,695. J. W. Hurley was issued U.S. Pat. No. 857,568 on Jun. 18, 1907 and on Apr. 22, 1941 N. J. Simpkins was issued U.S. Pat. No. 2,274,250.

F. P. Savage was issued U.S. Pat. No. 2,396,020 on Mar. 5, 1946. U.S. Pat. No. 2,694,221 was issued to W. Dura on Nov. 16, 1954. U.S. Pat. No. 5,393,261 was issued to C. D. Winton on Feb. 28, 1995. U.S. Pat. No. 6,159,090 was issued to M. W. Thompson on Dec. 12, 2000.

While these meat-tenderizing devices may be suitable for the purposes for which they were designed, they would not be as suitable for the purposes of the present invention, as hereinafter described.

U.S. Pat. No. 112,092

Inventor: L. B. Tarbox

Issued: Feb. 21, 1871

The combination of the die-plate B, platen C, having plunger D, provided with inwardly-projecting pins K, the standard F, supporting a lever-pivot and a plunger-guide, the lever G, having a mortise provided with a journal-pin, and the disk I, journaled within said mortise and provide with side flanges, L engaging the top of said plunger and under the pins at it's top, substantially as and for the purpose specified.

U.S. Pat. No. 158,280

Inventor: John W. James

Issued: Dec. 29, 1874

The beefsteak-mangler herein described, consisting of the perforated plates A A1, hinged together and provided with the detachable cutters a a b, circular at the base and tapering to chisel-edges, those upon the upper plate being arranged at right angles with those on the lower jaw, substantially as and for the purpose set forth.

U.S. Pat. No. 198,974

Inventor: Harvey Russell Fuller

Issued: Jan. 8, 1878

A beefsteak-tenderer consisting of a metallic table, A, provided with pyramidical projections a a, in combination with the roller B, having corresponding pyramidical projections, as set forth.

U.S. Pat. No. 715,695

Inventor: Francis M. Robinson

Issued: Dec. 9, 1902

In combination, meat-tenderer plates hingedly secured together, hinge members projected from the said plates, one of said members having an open slot to receive the pivot-fastening, the open end of said slot being normally closed by a pivoted latch piece, the corresponding hinge member having openings to receive the pivot-fastening aforementioned, substantially as set forth.

U.S. Pat. No. 857,568

Inventor: John W. Hurley

Issued: Jun. 18, 1907

In a meat-tenderer, the combination of a pair of jaws provided with teeth on their inner faces, and respectively made with hinge joints by which the jaws are separably hinged, means for locking the hinge joints against inadvertent separation, lever-like means pivoted on the front end of one jaw and arranged to engage with the front end of the other, to forcibly compress the jaws.

U.S. Pat. No. 2,274,250

Inventor: Nathaniel J. Simpkins

Issued: Apr. 22, 1941

The process of tendering a steak consisting of freezing the steak solid, deforming the steak in the contour of a waffle, and simultaneously with the deforming step cutting squares in the top face of the steak without puncturing the steak.

U.S. Pat. No. 2,396,020

Inventor: Francis Phillip Savage

Issued: Mar. 5, 1946

Meat perforating apparatus as described, comprising in combination, an upper hingedly movable plate, meat perforating teeth of truncated pyramid shape projecting downwardly from a portion of said plate, a lower stationary base block, meat perforating teeth of truncated pyramid shape projecting upwardly from said base block and interlocking with and spaced from said plate for use in compressing, perforating, and pounding meat between said upper plate and said lower base block teeth, a handle integral with said upper plate and said lower base block teeth, a stabilizer or hinge plate to which said upper plate is hingedly connected, a hinge pin pivotally connecting said upper plate element with said stabilizer element, helical compression springs between said upper stabilizer element and said base block, spring holders depending from said hinge pin and supporting said springs at their lower ends, a transverse anchor pin under said base bloc, and spring holders anchored on said anchor pin and beating on the top ends of said helical springs, each duplex set of said spring holders compressing each said helical spring on separation of the two cooperating spring holders from one another in a longitudinal direction on the downward of said handle.

U.S. Pat. No. 2,694,221

Inventor: Walter Dura

Issued: Nov. 16, 1954

A hand-operated meat tenderizer including a generally cylindrical drum fabricated of relatively hard wood rotatably mounted upon a shaft having ends extending axially beyond the ends of said drum, a plurality of circumferentially-spaced trapezoidally-shaped slots in the surface of said drum, a plurality generally u-shaped cutters disposed in each of said slots in axially-spaced relation to each other, the ends of said cutters extending radially beyond the surface of said drum, cutters in circumferentially adjacent rows being axially spaced from adjacent cutters, trapezoidally-shaped cutter-retaining strips fabricated of relatively soft wood disposed in said slots, and handles adapted to be manually held by the user rotatably mounted on each end of said shaft.

U.S. Pat. No. 5,393,261

Inventor: Carl D. Winton

Issued: February 28

A meat tenderizing device having a first plate with a surface having a plurality of truncated pyramid projections extending outwardly therefrom, a second plate having a plurality of projections extending outwardly therefrom, a first handle connected to the first plate and extending outwardly therefrom, and a second handle connected to the second plate and extending outwardly therefrom. Each of the truncated pyramid projections has a hole formed in an area opposite to the surface. The projections of the second plate are in a meshing relationship with the plurality of projections of the first plate. The second plate is hingedly connected to the second plate. The first and second handles serve to move the first and second plates between a first meshing position and a second angularly offset position. A ledge extends around a portion of the periphery of the first plate and extends upwardly from the surface of the first plate so as to have a height less than a height of the truncated pyramid projections. The second plate has a second ledge extending around a portion of the periphery of the second plate.

U.S. Pat. No. 6,159,090

Inventor: Michael W. Thompson

Issued: Dec. 12, 2000

This invention relates to food preparation; in particular this invention relates to an apparatus used to prepare meats and poultry; and more particularly this invention relates to an apparatus and method to tenderize meats and poultry products.

SUMMARY OF THE PRESENT INVENTION

The present invention relates generally to meat tenderizers and, more specifically, to a tenderizing tray having a plurality of conical projections extending upward from a base thereof. The conical projections cause holes to be punctured in the surface of the meat which aide in the retention of marinades and spices contained in the tenderizing tray. Additionally, the conical projections provide a greater heated cooking surface when the meat is being cooked.

A primary object of the present invention is to provide a tenderizing tray that can overcome the shortcomings of the prior art.

Another secondary object of the present invention is to provide a tenderizing tray having a base enclosed by sidewalls extending from a periphery of the base.

An even further object of the present invention is to provide a tenderizing tray having a plurality of upwardly projecting conical tines extending from the base and surrounded by the side walls for perforating a meat product when placed thereon.

Another object of the present invention is to provide a tenderizing tray for wicking the marinade deeply into the meat.

Still another object of the present invention is to provide a tenderizing tray that allows the marinade to move freely under the meat during the marinating process.

Another object of the present invention is to provide a tenderizing tray having a cover that is selectively connectable with the tenderizing tray for sealing freshness therein.

A further object of the present invention is to provide a tenderizing tray wherein the side walls and cover have a mating snap-on sealing mechanism.

Yet another object of the present invention is to provide a tenderizing tray that will prohibit the spillage of the marinade during transport.

Still another object of the present invention is to provide a tenderizing tray that will more effectively allow the penetration of the marinade into the meat product used therewith.

Still yet another object of the present invention is to provide tenderizing tray for use with a hand-held rolling tenderizer for providing simultaneous tenderization over the entire surface of the meat.

Another object of the present invention is to provide a tenderizing tray that, in an inverted position, may be utilized as a cutting board.

Yet another object of the present invention is to provide a tenderizing tray that is simple and easy to use.

Still yet another object of the present invention is to provide a tenderizing tray that is inexpensive to manufacture and operate.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views. The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
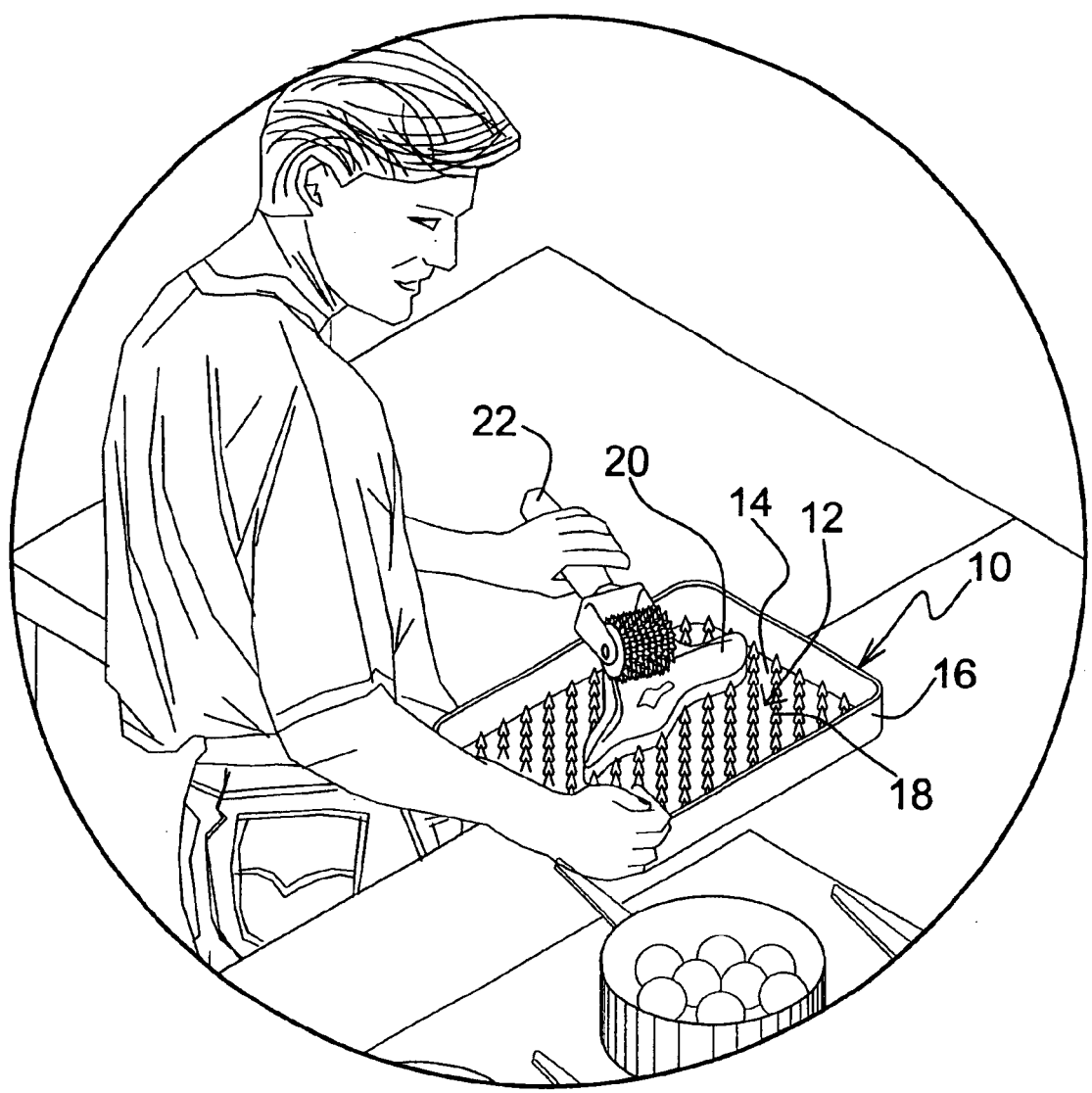
FIG. 1 is an illustrative view of the tenderizing tray of the present invention in use.

Turning now descriptively to the drawings, in which similar reference characters denote similar elements throughout the several views, the Figures illustrate the wind energized electric vehicle of the present invention. With regard to the reference numerals used, the following numbering is used throughout the various drawing figures.

10 tenderizing tray of the present invention
12 base
14 first side of the base
15 second side of the base
16 tray wall
18 tines
19 puncture holes
20 meat
22 meat tenderizer
24 lip
26 cover
28 locking mechanism
30 sealing mechanism
32 marinade
34 spices
36 roller element
38 axle
40 roller tines
41 puncture holes.

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 12 illustrate a meat tenderizer of the present invention indicated generally by the numeral 10.

FIG. 1 is an illustrative view of the tenderizing tray of the present invention in use. The tenderizing tray 10 is shown having a cut of meat 20 positioned therein for marinating and tenderizing thereof. The tenderizing tray 10 of the present invention is formed from a base 12 having a predetermined size and shape. For purposes of example; only, the base 12 is shown as having a rectangular shape, however, the base 12 may be formed in any shape and size that is easy to use, store, and which can hold a plurality of different size cuts of meat 20. The base 12 has a first side 14 having a plurality of tines 18 extending therefrom, and a second side 15 that is substantially flat, as is clearly shown in FIG. 12. The plurality of tines 18 are preferably conical shape projections for puncturing a hole in a surface of a piece of meat for aiding in the marinating of the piece of meat 20. However, the tines 18 can be of any shape and size that is able to puncture a hole in a piece of meat thus increasing the effectiveness with which the piece of meat 20 is marinated and made tender. Side walls 16 extend about a periphery of the base 12 forming a pool. The: plurality of tines 18 extend into the pool whereby marinade may be retained therein. The tray walls 16 have a predetermined height that is at least greater than the height of the plurality of tines 18.

Figure 11:
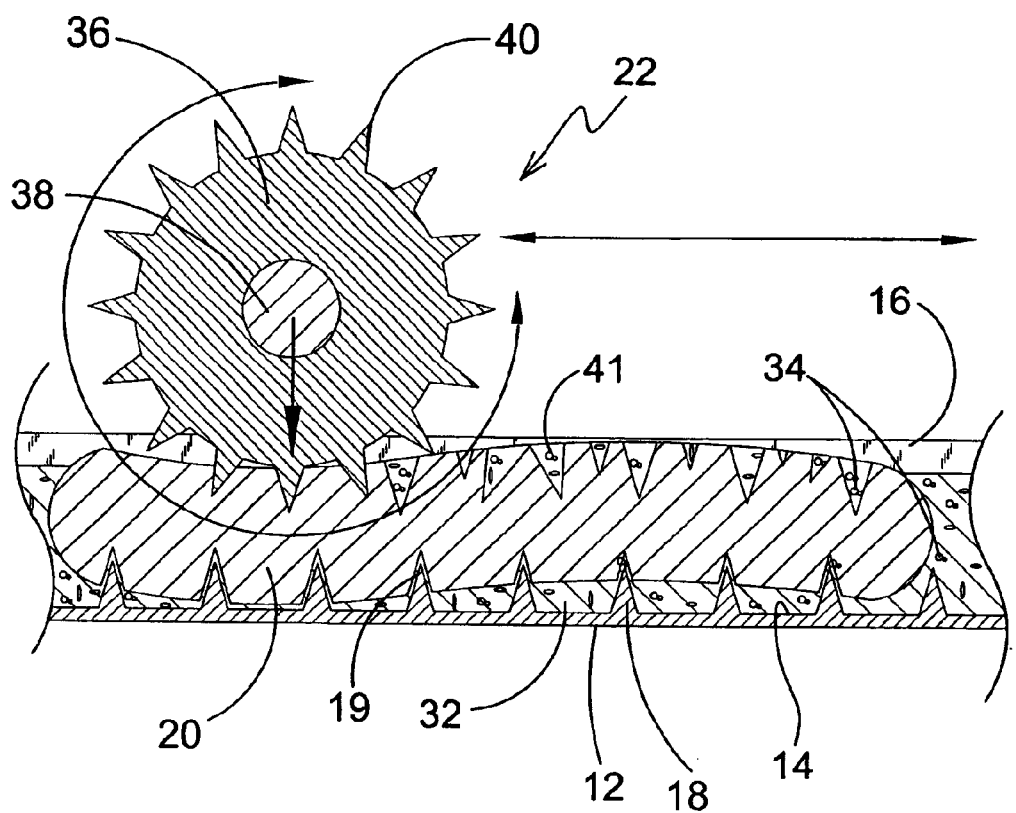
FIG. 11 is a cross-sectional view a meat tenderizer being used with the tenderizing tray of the present invention.

The tenderizing tray 10 of the present invention is shown being used with a meat tenderizer 22 having rolling tines positioned on a plurality of roller elements as shown in FIG. 11. Using the meat tenderizer 22 with the tenderizing tray 10 of the present invention allows for a user to puncture holes in both surfaces of a piece of meat contained therein. Puncturing holes in both surfaces allows for more tenderization and improved marinating of the piece of meat 20.

Figure 2:
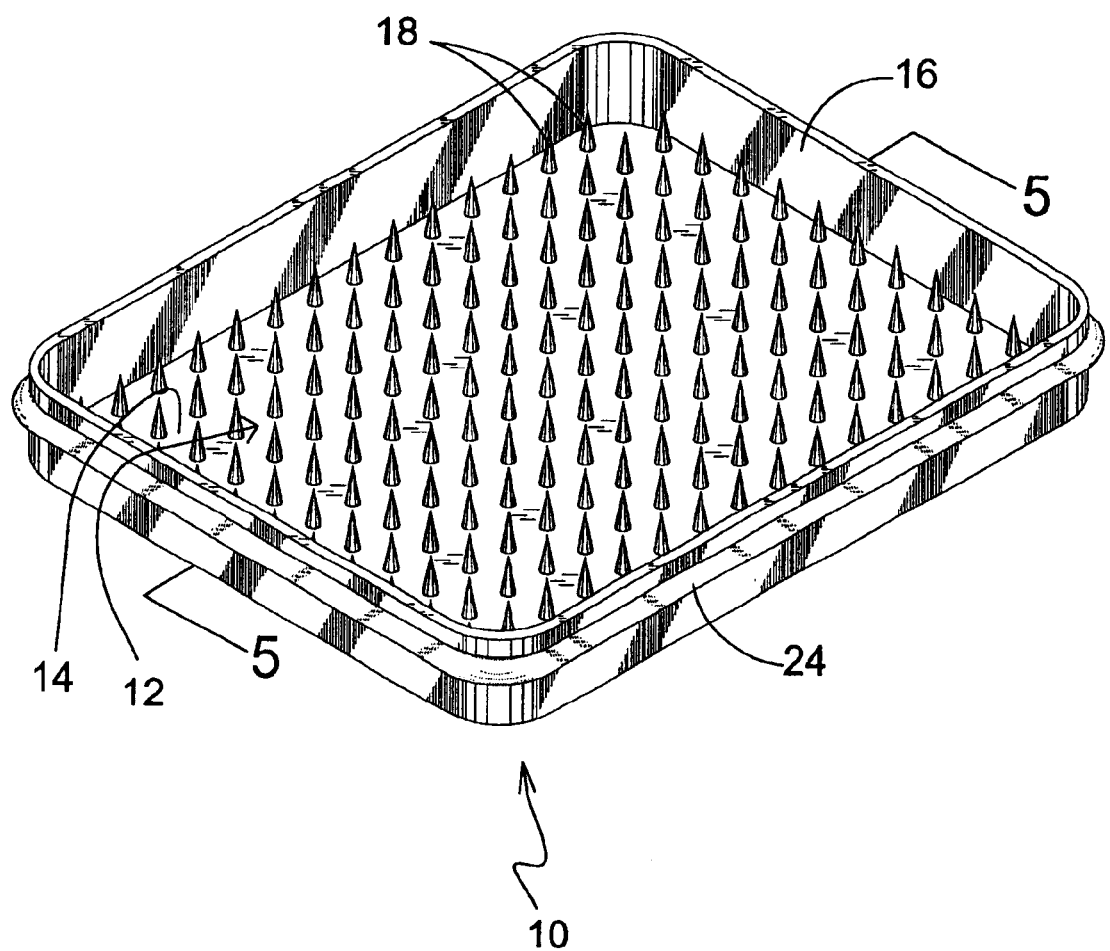
FIG. 2 is a perspective view of the tenderizing tray of the present invention.
Figure 3:
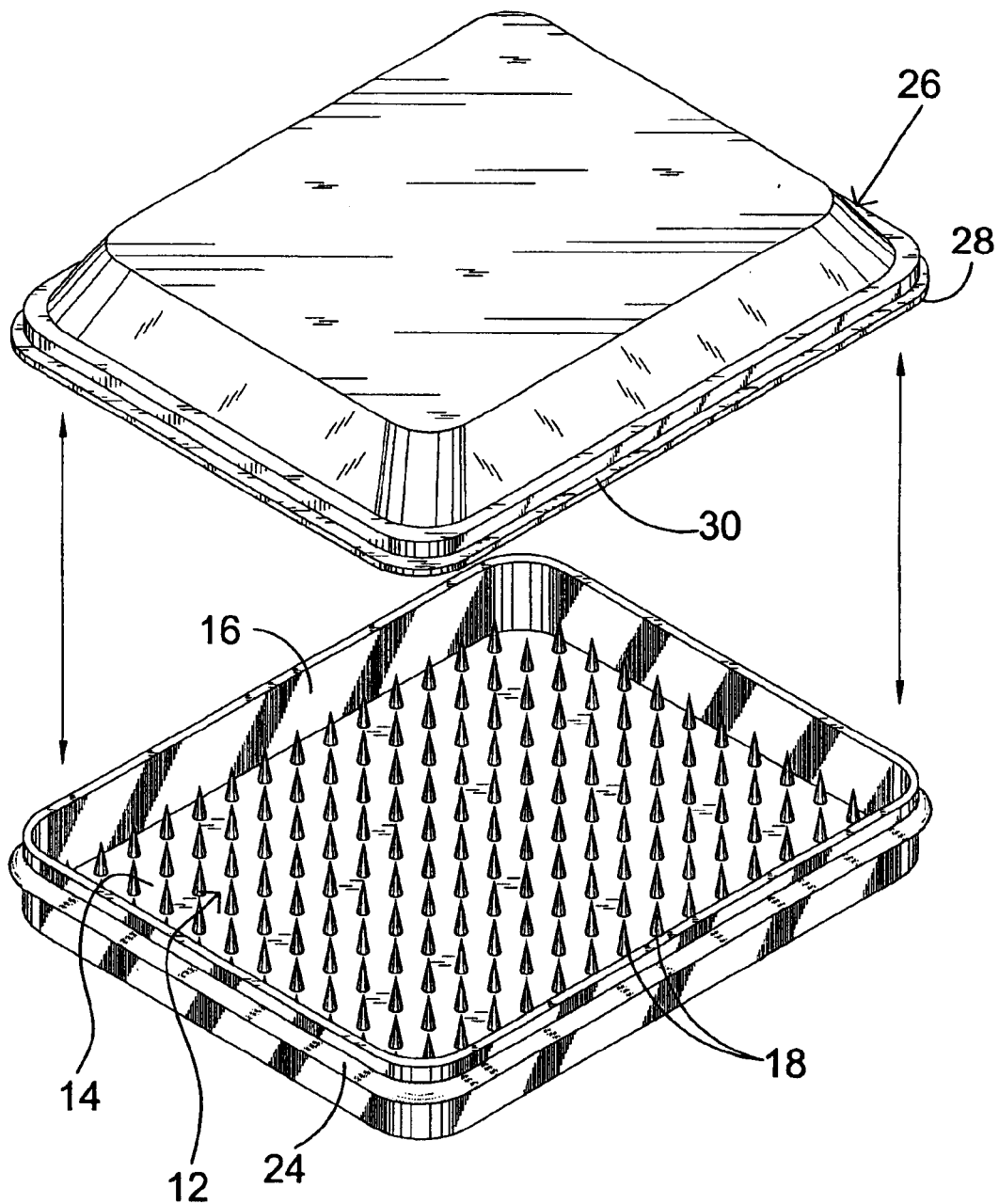
FIG. 3 is a perspective view of the tenderizing tray of the present invention with a cover disconnected from the tray.

FIG. 2 is a perspective view of the tenderizing tray of the present invention. The tenderizing tray 10 of the present invention includes the base 12 having a first side 14. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

FIG. 3 is a perspective view of the tenderizing tray of the present invention with a cover disconnected from the tray. The tenderizing tray 10 of the present invention includes the base 12 having the first side 14. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

The cover 26 has a shape that corresponds with the shape of the tenderizing tray 10. Positioned around an outer edge of the cover 26 is a locking mechanism 28 and a sealing mechanism 30. The locking mechanism 28 is aligned with and mates with the lip 24 of the tray wall 16. Upon aligning the locking mechanism 28 with the lip 24, and applying pressure evenly about the cover 26, the cover 26 is releasably secured to the lip 24 of the tray 10. The sealing mechanism 30 causes a hermetic seal to be formed thereby ensuring freshness of the meat contained therein and further prevents any of the contents within the tray 10 from spilling.

Figure 4:
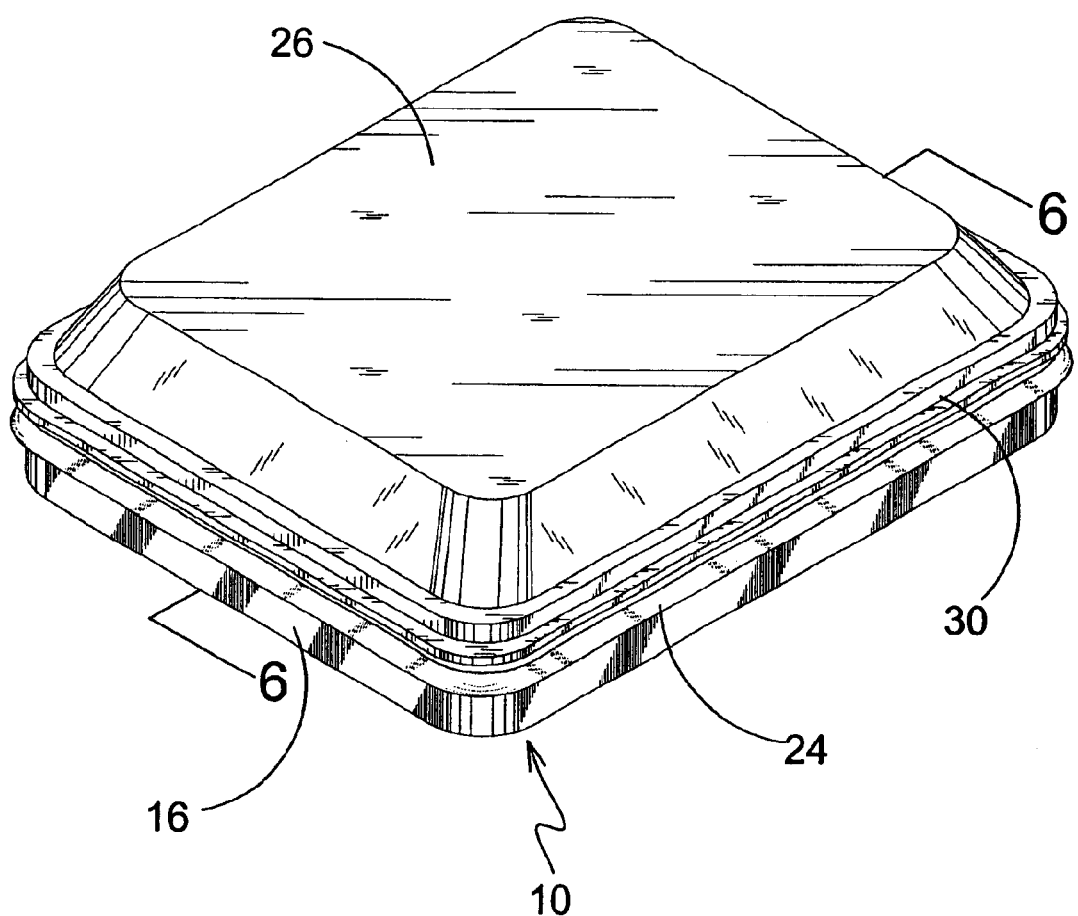
FIG. 4 is a perspective view of the tenderizing tray of the present invention having the cover secured thereon.

FIG. 4 is a perspective view of the tenderizing tray of the present invention having the cover secured thereon. The tenderizing tray 10 of the present invention includes the base 12 having the first side 14. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

The cover 26 has a shape that corresponds with the shape of the tenderizing tray 10. Positioned around an outer edge of the cover 26 is a locking mechanism 28 and a sealing mechanism 30. The locking mechanism 28 is aligned with and mates with the lip 24 of the tray wall 16. Upon aligning the locking mechanism 28 with the lip 24, and applying pressure evenly about the cover 26, the cover 26 is releasably secured to the lip 24 of the tray 10. The sealing mechanism 30 causes a hermetic seal to be formed thereby ensuring freshness of the meat contained therein and further prevents any of the contents within the tray 10 from spilling. FIG. 4 shows the cover 26 secured to the tenderizing tray 10 of the present invention.

Figure 5:
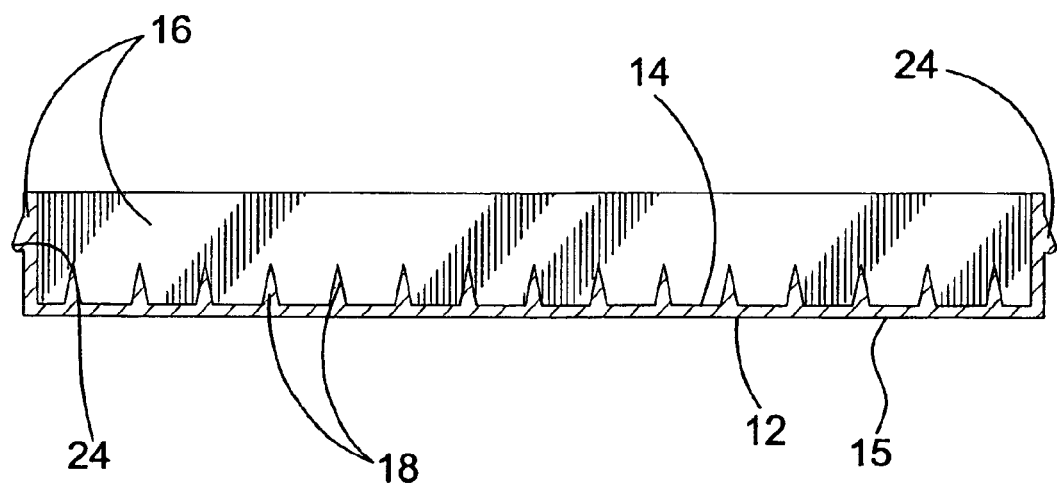
FIG. 5 is a cross-sectional view of the tenderizing tray of the present invention taken along line 5—5 in FIG. 2.

FIG. 5 is a cross-sectional view of the tenderizing tray of the present invention taken along line 5—5 in FIG. 2. The tenderizing tray 10 of the present invention includes the base 12 having the first side 14 and the second side 15. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

Figure 6:
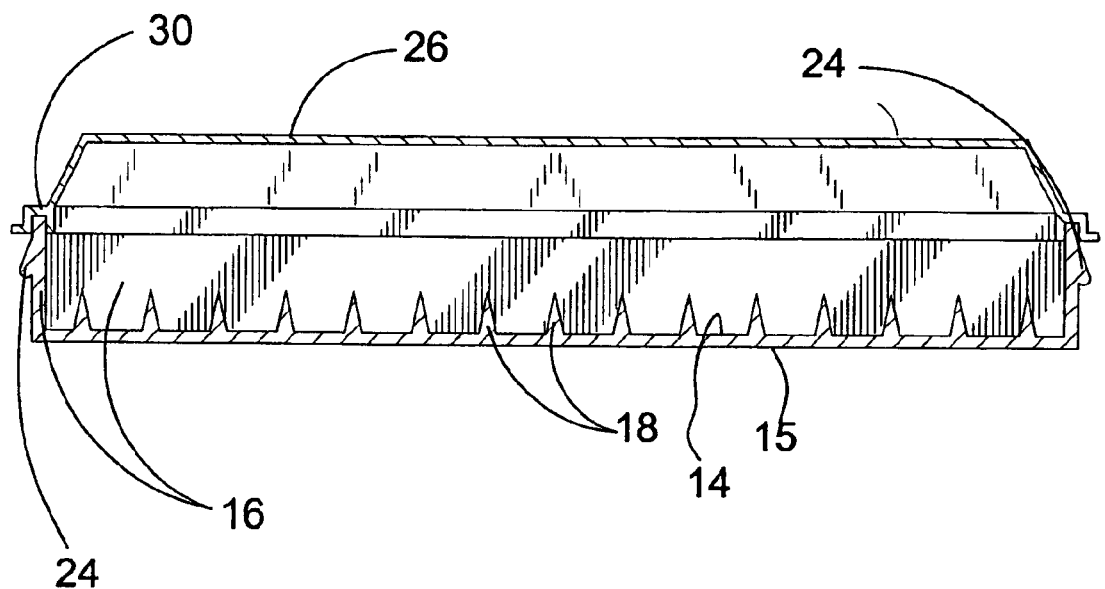
FIG. 6 is a cross-sectional view of the tenderizing tray of the present invention taken along line 6—6 in FIG. 4.

FIG. 6 is a cross-sectional view of the tenderizing tray of the present invention taken along line 6—6 in FIG. 4. The tenderizing tray 10 of the present invention includes the base 12 having the first side 14 and second side 15. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

The shape of the cover 26 corresponds with the shape of the tenderizing tray 10. Positioned around an outer edge of the cover 26 is a locking mechanism 28 and a sealing mechanism 30. The locking mechanism 28 is aligned with and mates with the lip 24 of the tray wall 16. Upon aligning the locking mechanism 28 with the lip 24, and applying pressure evenly about the cover 26, the cover 26 is secured to the lip 24 of the tray 10. The sealing mechanism 30 causes a hermetic seal to be formed thereby ensuring freshness of the meat contained therein and further prevents any of the contents within the tray 10 from spilling. FIG. 6 shows the cover 26 securely fit to the tenderizing tray 10 of the present invention.

Figure 7:
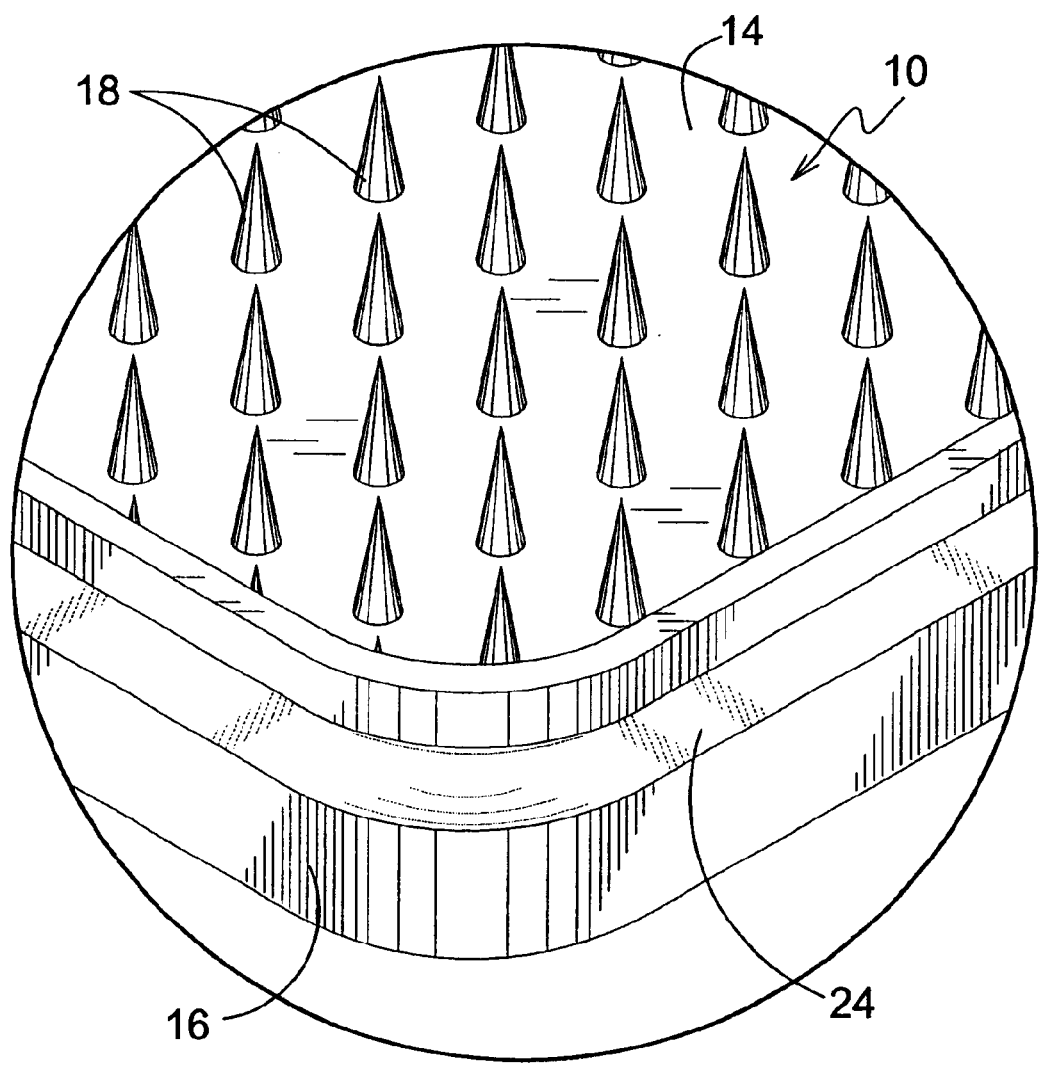
FIG. 7 is a detailed view of a corner of the tenderizing tray of the present invention.

FIG. 7 is a detailed view of a corner of the tenderizing tray of the present invention. The tenderizing tray 10 of the present invention includes the base 12 having the first side 14. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

Figure 8:
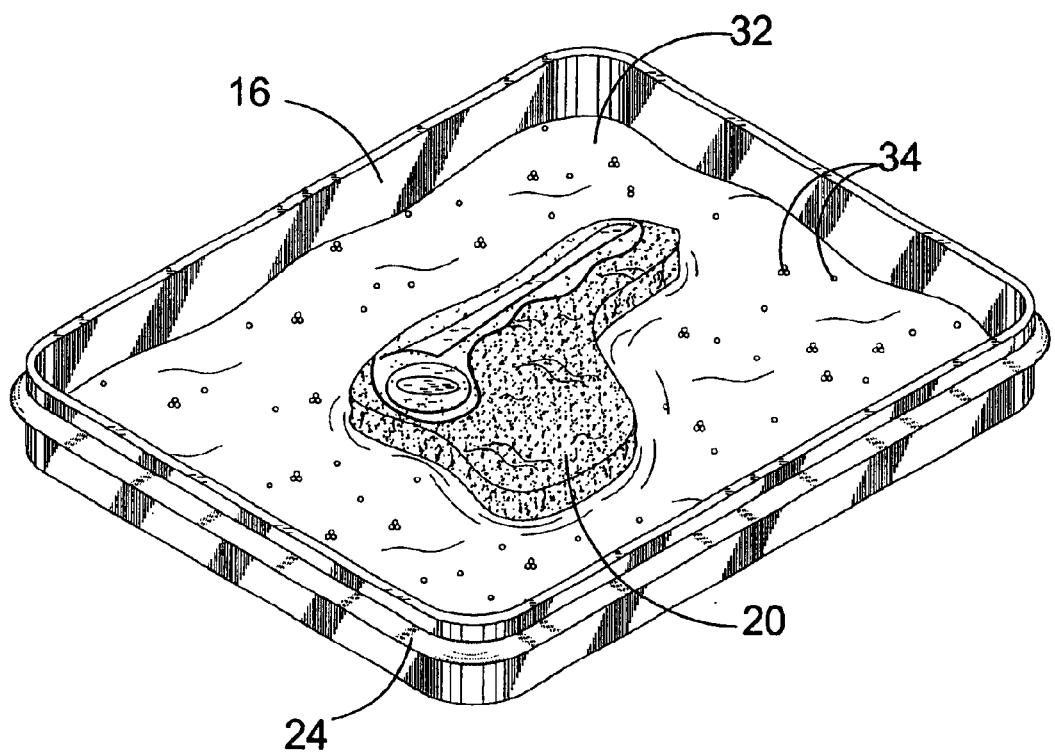
FIG. 8 is a perspective view of the tenderizing tray of the present invention having a piece of meat and marinade positioned therein.

FIG. 8 is a perspective view of the tenderizing tray of the present invention having a piece of meat positioned therein. The tenderizing tray 10 of the present invention includes the base 12 having the first side 14. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

FIG. 8 shows the tenderizing tray 10 of the present invention having marinade 32 and spices 34 contained within the tray walls 16. The piece of meat 20 is shown resting atop the tines 18 extending up from the first side 14 of the base 12. The tines 18 cause holes to be punctured therein which allow the marinade and spices to be absorbed more efficiently by the piece of meat 20. The tines 18 are unseen due to the level of marinade 32 and spices 34 within the tray 10 being above the height to which the tines 18 extend.

Figure 9:
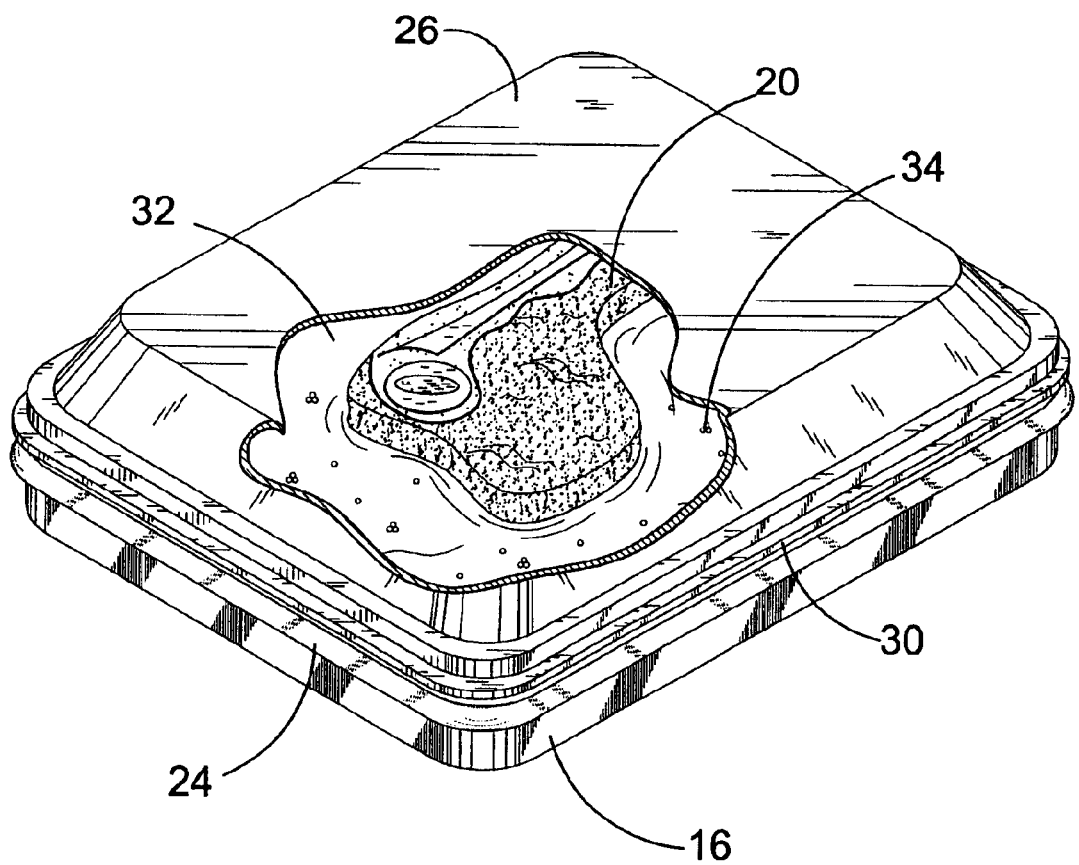
FIG. 9 is a partial cut away view of the cover of the tenderizing tray of the present invention having a piece of meat and marinade sealed therein.

FIG. 9 is a cut away view of the cover of the tenderizing tray of the present invention having a piece of meat sealed therein. The tenderizing tray 10 of the present invention includes the base 12 having the first side 14. The first side 14 of the base 12 has a plurality of tine 18 extending upward into the tenderizing tray 10. The plurality of tines 18 cause holes to be punctured into a surface of a piece of meat for increased tenderization and more efficient marinating thereof. Furthermore, the tenderization tray 10 can be used as a cooking tray as well whereby the tines 18 function as heating elements which enables the piece of meat to be cooked more thoroughly throughout. The tray walls 16 extend around a perimeter of the base 12 and function to retain the marinade and spices within the tray 10. The tray walls 16 have a height that is greater than the height of the tines 18 extending from the base 12. The tray walls 16 further includes a lip 24 positioned around an outer edge thereof for securing a cover 26 thereto. Upon placing a piece of meat on the tines 18, holes are punctured in a surface thereof and allows for more efficient marinating of that piece of meat.

FIG. 9 shows the tenderizing tray 10 of the present invention having marinade 32 and spices 34 contained within the tray walls 16. The cover 26 is secured to the lip 24 of the tray 10 thereby allowing for the freshness of the meat 20 to be maintained as the meat is stored in an airtight manner while being seasoned. The piece of meat 20 is shown resting atop the tines 18 extending up from the first side 14 of the base 12. The tines 18 cause holes to be punctured therein which allow the marinade and spices to be absorbed more efficiently by the piece of meat 20. The tines 18 are unseen because due to the level of marinade 32 and spices 34 within the tray 10 being above the height to which the tines 18 extend.

Figure 10:
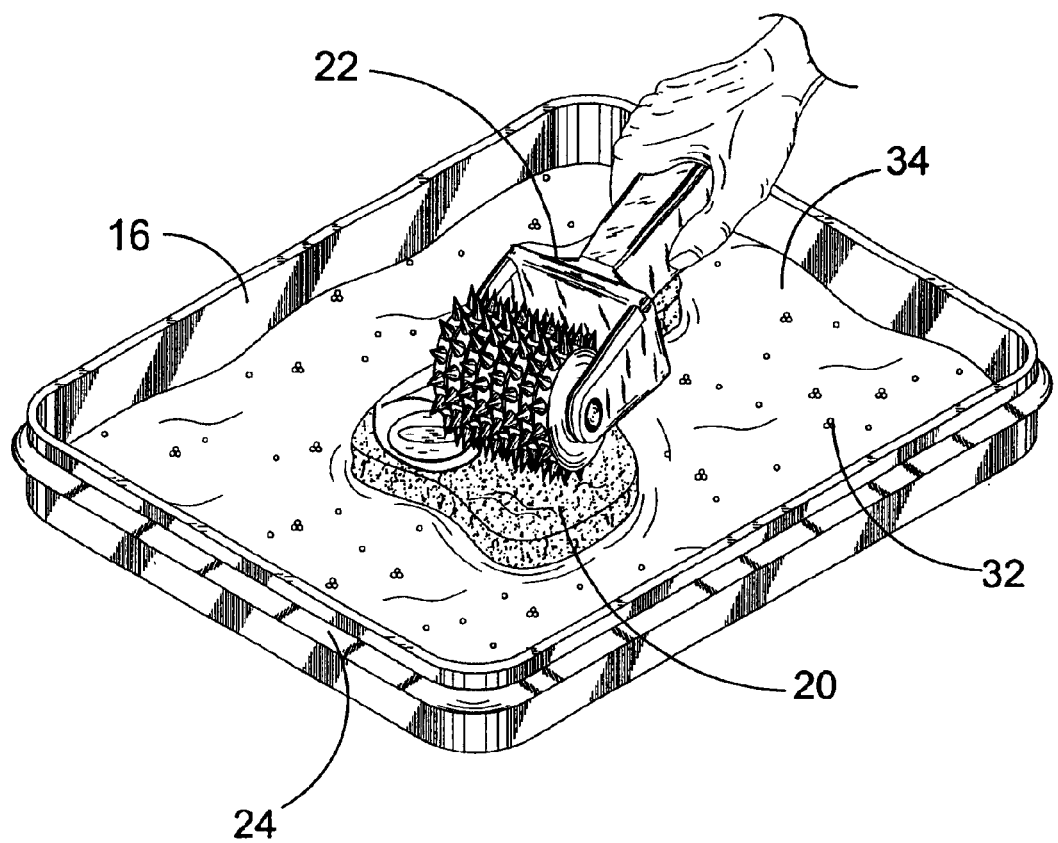
FIG. 10 is an illustrative view of a meat tenderizer being used with the tenderizing tray of the present invention.

FIG. 10 is an illustrated view of a meat tenderizer being used with the tenderizing tray of the present invention. The tenderizing tray 10 of the present invention includes the base 12 having the first side 14 and second side. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3.

Upon placing a piece of meat on the tines 18, holes are punctured in a surface thereof allowing for more efficient marinating of the piece of meat.

FIG. 10 shows the tenderizing tray 10 of the present invention having marinade 32 and spices 34 contained within the tray walls 16. The piece of meat 20 is shown resting atop the tines 18 extending up from the first side 14 of the base 12. The tines 18 cause holes to be punctured therein which allow the marinade and spices to be absorbed more efficiently by the piece of meat 20. The tines 18 are unseen due to the level of marinade 32 and spices 34 within in the tray 10 being above the height to which the tines 18 extend. The meat 20 is shown being further tenderized by the meat tenderizer 22. The meat tenderizer 22 causes holes to be punctured in both surfaces of the piece of meat 20 thereby increasing the surface area for absorbing the marinade 32 and spices 34.

FIG. 11 is a cross-sectional view a meat tenderizer being used with the tenderizing tray of the present invention. The tenderizing tray 10 of the present invention includes the base 12 having the first side 14 and second side. The first side 14 of the base 12 has a plurality of tines 18 extending therefrom. The plurality of tines 18 cause holes to be punctured into a surface of a piece of meat positioned thereon for increased tenderization and more efficient marinating thereof. Furthermore, the tenderization tray 10 can be used as a cooking tray as well whereby the tines 18 function as heating elements which enables the piece of meat to be cooked more thoroughly throughout. The walls 16 extend about a periphery of the base 12 forming the pool and aid in retaining the marinade and spices within the tray 10. The tray walls 16 have a height that is greater than the height of the tines 18 extending from the base 12. The tray walls 16 further includes a lip 24 positioned around an outer edge thereof for securing a cover 26 thereto, as shown in FIG. 3. Upon placing a piece of meat on the tines 18, holes are punctured in a surface thereof allowing for more efficient marinating of the piece of meat.

The tenderizing tray 10 of the present invention is shown having marinade 32 and spices 34 contained within the tray walls 16. The piece of meat 20 is shown resting atop the tines 18 extending up from the first side 14 of the base 12. The tines 18 cause holes 19 to be punctured therein which allow the marinade and spices to be absorbed more efficiently. The meat tenderizer 22 includes a plurality of roller elements 36 having a plurality of tines 40 extending around a circumference thereof. The roller elements 36 are rotatable 360 degrees about the axle 38. A user can guide the roller elements 36 over a first surface of the piece of meat 20 thereby puncturing holes 41 therein. The pressure exerted against the first surface of the meat 20 by the rollers 36 of the meat tenderizer 22 causes holes 19 to punctured in a second side of the meat 20 by the tines 18 extending from the base 12 of the tray 10. Having puncture holes 19, 41 in both surfaces of the meat 20 increases the efficiency at which the meat 20 is marinated.

Figure 12:
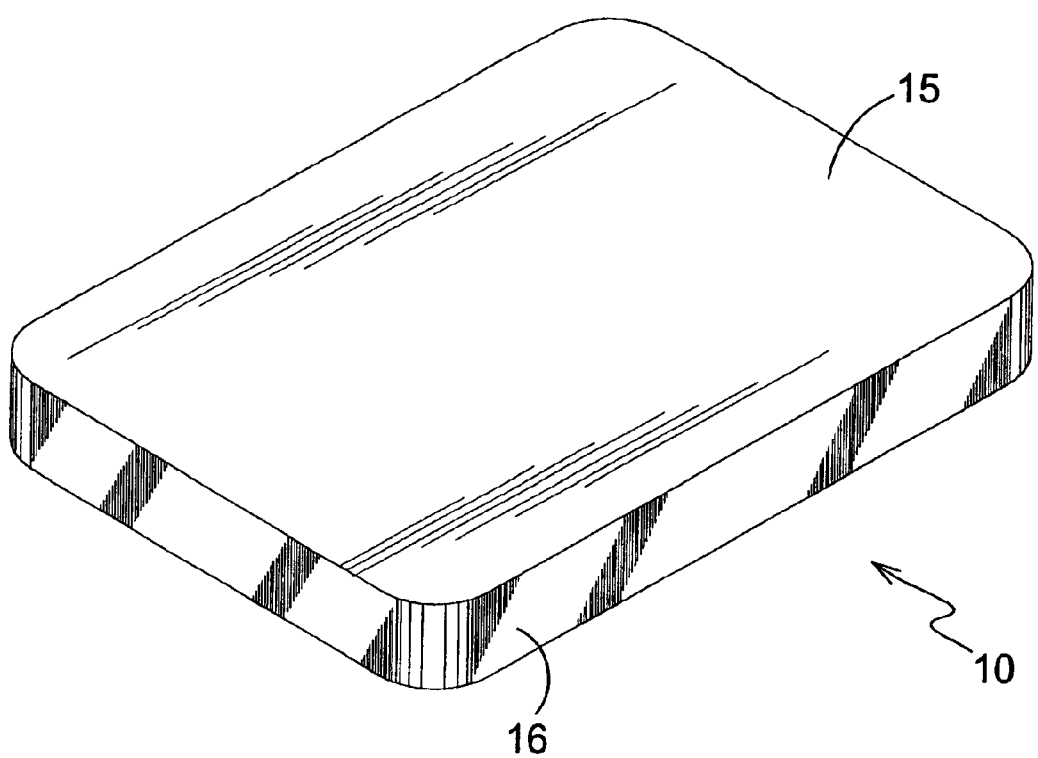
FIG. 12 is a perspective view of the tenderizing tray of the present invention in an inverted position for use as a cutting board.

FIG. 12 is a perspective view of the tenderizing tray of the present invention inverted for use as a cutting board. The tenderizing tray 10 of the present invention may be inverted so that the second side 15 of the base 12 is exposed. Preferably the second side 15 of the base 12 is substantially flat and scratch resistant thereby allowing the tray 10 to also be used as a cutting board for the meat 20 prior to marinated being retained within the tray wall 16. As the tray walls 16 have a height greater than the tines 18, a countertop is protected from being damaged by the tines 18 when the tray is in an inverted position.

From the above description it can be seen that the tenderizer tray of the present invention is able to overcome the shortcomings of prior art devices by providing a tray having a plurality of tines extending from a base thereof. The tray is enclosed by tray walls for retaining marinade therein. The plurality of tines cause holes to be punctured in the meat. The puncture holes increase the efficiency at which the marinade is absorbed by the meat. A cover is provided to maintain freshness while marinating as well as preventing spillage of the marinade from the tenderizing tray.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A tray for tenderizing, marinating and cooking a piece of meat comprising:

a) a base;

b) a tray wall extending around a periphery of said base forming a pool for retaining marinade within said tray;

c) a plurality of tines extending from a first side of said base and into said pool, wherein upon placing a piece of meat atop said plurality of tines, a plurality of holes are caused to be punctured in a surface of the meat adjacent to said tines thereby increasing the surface area of the meat able to absorb the marinade, said base having a second side, opposite said first side, said second side being substantially flat and adapted to action as a cutting board;

d) a lip comprising a rounded end positioned around an entire outer edge of said tray wall;

e) a cover having a rim with a shape corresponding to a shape of said lip, said cover including a locking mechanism for releasably securing said cover to said lip and a sealing mechanism for forming an air-tight seal between said cover and said lip, said cover comprising a flat upper section with sidewalls which taper downward to said sealing mechanism, said sealing mechanism comprising a channel extending around an entire outer edge of said cover, said channel engaging a top end of said tray wall, said locking mechanism comprising a tab extending perpendicularly from said sealing mechanism and extending around an entire edge of said cover, said locking mechanism adapted to engage said lip and releasably secure said cover to said tray, said tines being adapted to function as heating elements when said meat is cooked inside said tray.

2. The tray as recited in claim 1, wherein said second side is scratch resistant.

* * * * *